(12) United States Patent
Ma et al.

(10) Patent No.: US 12,085,224 B2
(45) Date of Patent: Sep. 10, 2024

(54) QUICK RELEASE DEVICE

(71) Applicant: Guangdong Shuowei Technology Co., Ltd., Dongguan (CN)

(72) Inventors: Wenhong Ma, Dongguan (CN); Lei Luo, Dongguan (CN); Gang Yang, Dongguan (CN); Lei Liu, Dongguan (CN)

( * ) Notice: Subject to any disclaimer, the term of this patent is extended or adjusted under 35 U.S.C. 154(b) by 0 days.

(21) Appl. No.: 18/413,168

(22) Filed: Jan. 16, 2024

(65) Prior Publication Data

US 2024/0151348 A1    May 9, 2024

(30) Foreign Application Priority Data

Jan. 5, 2024  (CN) .......................... 202420034774.5

(51) Int. Cl.
*F16M 11/04* (2006.01)
*F16M 13/02* (2006.01)

(52) U.S. Cl.
CPC .................................. *F16M 13/02* (2013.01)

(58) Field of Classification Search
CPC ....... F16M 11/041; F16M 13/04; F16M 13/02
See application file for complete search history.

(56) References Cited

U.S. PATENT DOCUMENTS

| | | | | |
|---|---|---|---|---|
| 9,611,881 B2 * | 4/2017 | Khodapanah | .......... | F16M 11/10 |
| 9,651,069 B2 * | 5/2017 | Aspinall | .................... | F16B 2/04 |
| 9,869,423 B2 * | 1/2018 | Khodapanah | ...... | F16M 11/2021 |
| 11,486,533 B1 * | 11/2022 | Zou | ....................... | G03B 17/561 |
| 11,519,548 B2 * | 12/2022 | Hsu | ....................... | F16M 11/041 |
| 11,675,254 B2 * | 6/2023 | Zhou | .................... | G03B 17/561 |
| | | | | 396/428 |
| 11,733,596 B2 * | 8/2023 | Zhou | ..................... | F16M 11/041 |
| | | | | 396/428 |
| 11,752,596 B2 * | 9/2023 | Stabler | .................. | F41G 11/003 |
| | | | | 248/229.16 |
| 11,796,128 B1 * | 10/2023 | Ma | ........................ | F16M 11/041 |
| 2023/0366504 A1 * | 11/2023 | Torbitt | ............... | F16M 11/2092 |

\* cited by examiner

*Primary Examiner* — Bradley Duckworth
(74) *Attorney, Agent, or Firm* — Daniel M. Cohn; Howard M. Cohn (57) ABSTRACT

The present disclosure provides a quick release device, and relates to the technical field of accessories for electronic products. The quick release device includes a device body. A rotary tray is movably disposed at a bottom of the device body, and the rotary tray is used to connect a terminal bracket. A rotary buckle of which one end extends to the bottom of the device body and is fastened to the rotary tray is movably inside the device body, and the device body rotates 360° relative to the rotary buckle and the rotary tray. Through the spring-loaded bead, the device body may rotate 360° for adjustment and positioning, to meet a use requirement of a user. A product housing may be removed by only holding the product housing and toggling the operating rod. Therefore, operations are more simple, and convenience for outdoor sports is improved. Because the buckle II that may be triggered automatically through a button is clamped with the product housing, a procedure of assembling the product housing is further simplified. Because the buckle spring continuously abuts against the buckle crossbar, stability of a connection between the buckle II and the product housing, so that the product is more stable in a use process.

10 Claims, 12 Drawing Sheets

QUICK RELEASE DEVICE

TECHNICAL FIELD

The present disclosure relates the technical field of accessories for electronic products, in particular to a quick release device.

BACKGROUND

A quick release device, also known as a quick release bracket, is mainly used to fasten electronic products such as a mobile phone and a tablet computer through a terminal bracket to cycling equipment, a vehicle, or a photographing device. A user may conveniently view on terminal device during movement of the device. However, an existing quick release device has the following disadvantages in use.

The existing quick release device has a single structure. Therefore, the user needs to assemble an electronic product by two hands, which is inconvenient in an emergency process. In addition, there is a large safety hazard. Because a structure of the existing quick release device is single and simple, a protection strength is poor. As a result, the electronic product is easy to fall off and damaged.

SUMMARY

To achieve the above objective, the present disclosure provides the following technical solutions: A quick release device includes a device body. A rotary tray is movably disposed at a bottom of the device body, and the rotary tray is used to connect a terminal bracket. A rotary buckle of which one end extends to the bottom of the device body and is fastened to the rotary tray is movably inside the device body, and the device body rotates 360° relative to the rotary buckle and the rotary tray.

Two buckle crossbars are symmetrically disposed inside the device body, and two shaft levers jointly pass through inner parts of the two buckle crossbars. Buckles I are disposed on opposite surfaces of the two buckle crossbars, and buckles II are disposed at tops of the buckle crossbars. A buckle spring that is located between the two buckle crossbars is sleeved on the shaft lever.

A toggle lever I of which one end extends to a side of one buckle crossbar and a toggle lever II of which one end extends to a side of another buckle crossbar are disposed inside the device body. One end, away from the buckle crossbar, of the toggle lever II extends to the toggle lever I, and one end, away from the buckle crossbar, of the toggle lever I extends outside the device body.

A return switch that is located between the two buckle crossbars are disposed inside the device body. A button of which one end extends outside the device body and positioning grooves that are located on two sides of the button are disposed at a top of the return switch. The two buckles I are respectively clamped with the two positioning grooves.

As a preferred technical solution of the present disclosure, the toggle lever I include an operating rod, and a driving rod and a toggle lever body I that are disposed on one end of the operating rod, and the toggle lever body I is rotationally disposed inside the device body through a rotary shaft I.

As a preferred technical solution of the present disclosure, the toggle lever II include a toggle lever body II and a transmission rod that is disposed on one end of the toggle lever body II. The toggle lever body II is rotationally disposed inside the device body through a rotary shaft II, and the one end of the toggle lever body I and the one end of the toggle lever body II respectively extend to opposite sides of the two buckle crossbars.

As a preferred technical solution of the present disclosure, one end, away from the operating rod, of the driving rod extends to a side of one shaft lever, and one end, away from the toggle lever body II, of the transmission rod extends to a side of the driving rod. A reset spring is sleeved on a side of the transmission rod through a spring post, and one end, away from the driving rod, of the operating rod extends outside the device body.

As a preferred technical solution of the present disclosure, a fixing block and a fixing hole that is provided inside the fixing block are disposed at a bottom of the rotary tray. A plurality of bead grooves that are combined in a ring are provided at a top of the rotary tray, a spring-loaded bead of which one end extends inside of one bead groove is embedded at the bottom of the device body, and there is at least one spring-loaded bead.

As a preferred technical solution of the present disclosure, a plurality of buckle bodies that are combined in a ring are disposed at a bottom of the rotary buckle, the buckle bodies are clamped with a bottom of a bottom cover. A nut that is coaxially disposed with the fixing hole is disposed at the bottom of the rotary buckle, the rotary buckle is circular as a whole. A plurality of pallets are disposed on a circle of the rotary buckles, and bottoms of the pallets are slidingly connected to a top of the bottom cover.

As a preferred technical solution of the present disclosure, guiding slopes are symmetrically disposed at two ends of the top of the return switch, the two guiding slopes are located on a side of the two positioning grooves each, and a switch spring that abuts against a top of the rotary buckle is embedded at a bottom of the return switch.

As a preferred technical solution of the present disclosure, the device body is circular. The device body includes a bottom cover and an upper housing that is disposed at a top of the bottom cover. A toggle lever groove that is sleeved with the operating rod is provided on an outer ring of the upper housing, and a press button of which one end is clamped inside the toggle lever groove is disposed on an outer ring of the bottom cover.

A clamping groove that is clamped with one end of the reset spring is disposed on an inner ring of the upper housing, and a non-slip mat is embedded in a top of the upper housing. At least one positioning column of which one end extends to the return switch is disposed inside the upper housing. A stud is disposed inside the upper housing. A screw hole that is coaxially provided with the stud is disposed inside the bottom cover, and there is at least one stud and at least one screw hole.

As a preferred technical solution of the present disclosure, a boss is disposed at the top of the upper housing, two accommodation grooves are symmetrically provided at two ends of the boss. One end, away from the buckle crossbar, of the buckle II extends inside the accommodation grooves, and a buckle sign that is located at a side of the boss is etched at the top of the upper housing.

As a preferred technical solution of the present disclosure, a reinforcing rib of which one end is fastened to a side of the buckle II is disposed at a top of the buckle I, a shaft base that is sleeved with an end part of the shaft lever is disposed inside the upper housing, a clamp spring is clamped with two ends of the shaft lever.

Compared with the prior art, the quick release device provided in the present disclosure has the following beneficial effects:

In the quick release device, through the spring-loaded bead, the device body may rotate 360° for adjustment and positioning, to meet a use requirement of a user. A product housing may be removed by only holding the product housing and toggling the operating rod. Therefore, operations are more simple, and convenience for outdoor sports is improved. Because the buckle II that may be triggered automatically through a button is clamped with the product housing, a procedure of assembling the product housing is further simplified. Because the buckle spring continuously abuts against the buckle crossbar, stability of a connection between the buckle II and the product housing, so that the product is more stable in a use process.

Reference numerals: 1: device body; 101: bottom cover; 1011: press button; 1012: screw hole; 102: upper housing; 1021: toggle lever groove; 1022: clamping groove; 1023: non-slip mat; 1024: positioning column; 1025: stud; 1026: shaft base; 11: spring-loaded bead; 12: rotary buckle; 1201: buckle body; 1202: nut; 1203: pallet; 13: buckle crossbar; 1301: buckle I; 1302: buckle II; 1303: reinforcing rib; 14: shaft lever; 1401: buckle spring; 1402: clamp spring; 15: toggle lever I; 1501: operating rod; 1502: driving rod; 1503: toggle lever body I; 1504: rotary shaft I; 16: toggle lever II; 1601: toggle lever body II; 1602: transmission rod; 1603: rotary shaft II; 1604: spring post; 1605: reset spring; 17: return switch; 1701: button; 1702: positioning groove; 1703: guiding slope; 1704: switch spring; 18: boss; 1801: accommodation groove; 19: buckle sign; 2: rotary tray; 201: fixing block; 202: fixing hole; 203: bead groove; 3: transmit end positioning neodymium magnet; 4: product housing tray; 41: receive end positioning neodymium magnet; 5: neodymium magnet projection.

DESCRIPTION OF EMBODIMENTS

The technical solutions in embodiments of the present disclosure are clearly and completely described below with reference to the accompanying drawings in the embodiments of the present disclosure. Apparently, the described embodiments are merely a part rather than all of the embodiments of the present disclosure. All other embodiments obtained by a person of ordinary skill in the art based on embodiments of the present disclosure without creative efforts should fall within the protection scope of the present disclosure.

Embodiment 1. Refer to FIG. 1 to FIG. 11. A quick release device includes a device body 1. A rotary tray 2 is movably disposed at a bottom of the device body 1, and the rotary tray 2 is used to connect a terminal bracket. A rotary buckle 12 of which one end extends to the bottom of the device body 1 and is fastened to the rotary tray 2 is movably inside the device body 1, and the device body 1 rotates 360° relative to the rotary buckle 12 and the rotary tray 2.

Two buckle crossbars 13 are symmetrically disposed inside the device body 1, and two shaft levers 14 jointly pass through inner parts of the two buckle crossbars 13. Buckles 11301 are disposed on opposite surfaces of the two buckle crossbars 13, and buckles II 1302 are disposed at tops of the buckle crossbars 13. A buckle spring 1401 that is located between the two buckle crossbars 13 is sleeved on the shaft lever 14.

A toggle lever 115 of which one end extends to a side of one buckle crossbar 13 and a toggle lever II 16 of which one end extends to a side of another buckle crossbar 13 are disposed inside the device body 1. One end, away from the buckle crossbar 13, of the toggle lever II 16 extends to the toggle lever I 15, and one end, away from the buckle crossbar 13, of the toggle lever I 15 extends outside the device body 1.

A return switch 17 that is located between the two buckle crossbars 13 are disposed inside the device body 1. A button 1701 of which one end extends outside the device body 1 and positioning grooves 1702 that are located on two sides of the button 1701 are disposed at a top of the return switch 17. The two buckles I 1301 are respectively clamped with the two positioning grooves 1702. In actual implementation, a magnet may further be mounted on a top of the device body 1, and the magnet is magnetically connected to the product housing, so that a procedure of triggering the button 1701 is more flexible.

Figure 7:
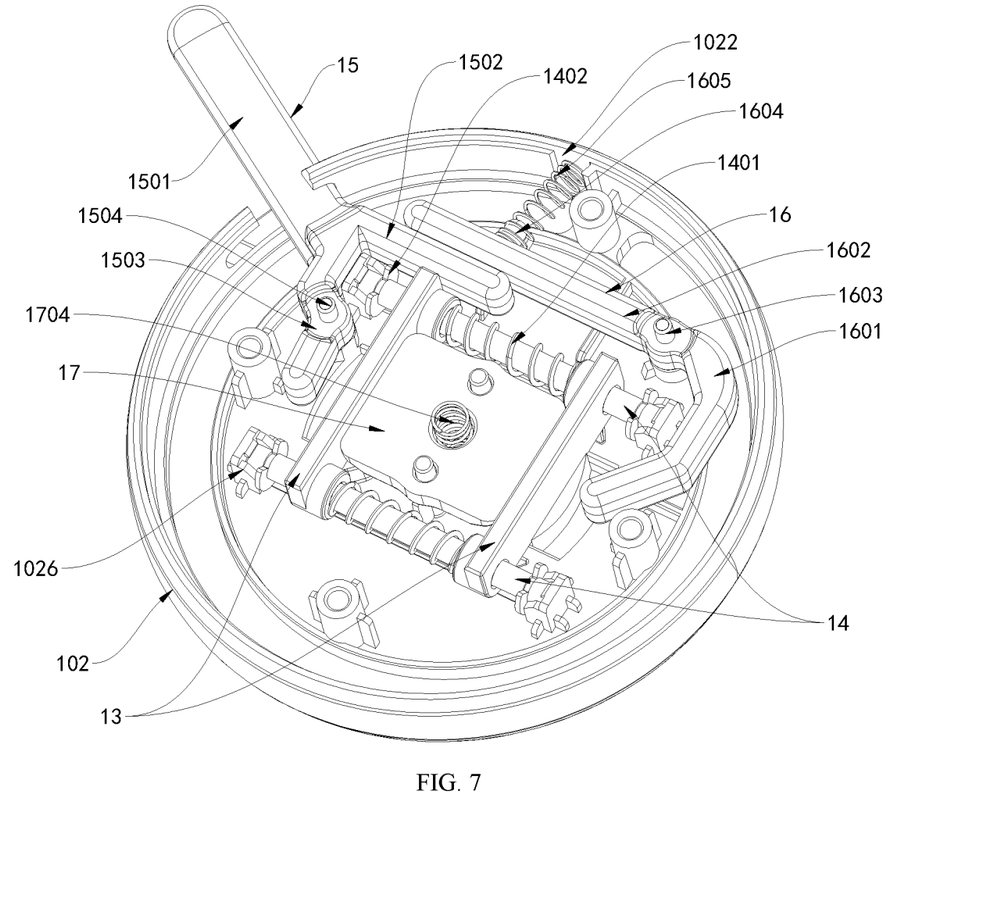
FIG. 7 is a schematic diagram of structures of a toggle lever I and a toggle lever II of a quick release device according to the present disclosure.
Figure 9:
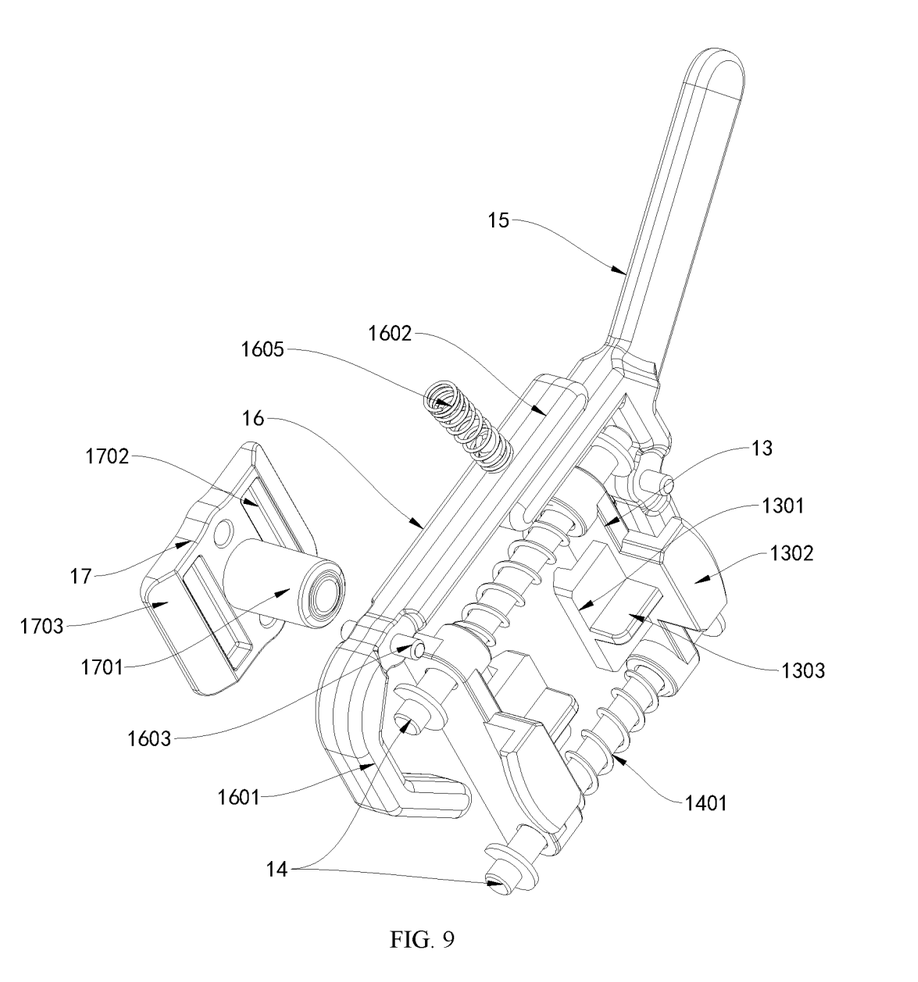
FIG. 9 is a schematic diagram of a structure of a buckle crossbar of a quick release device according to the present disclosure.
Figure 10:
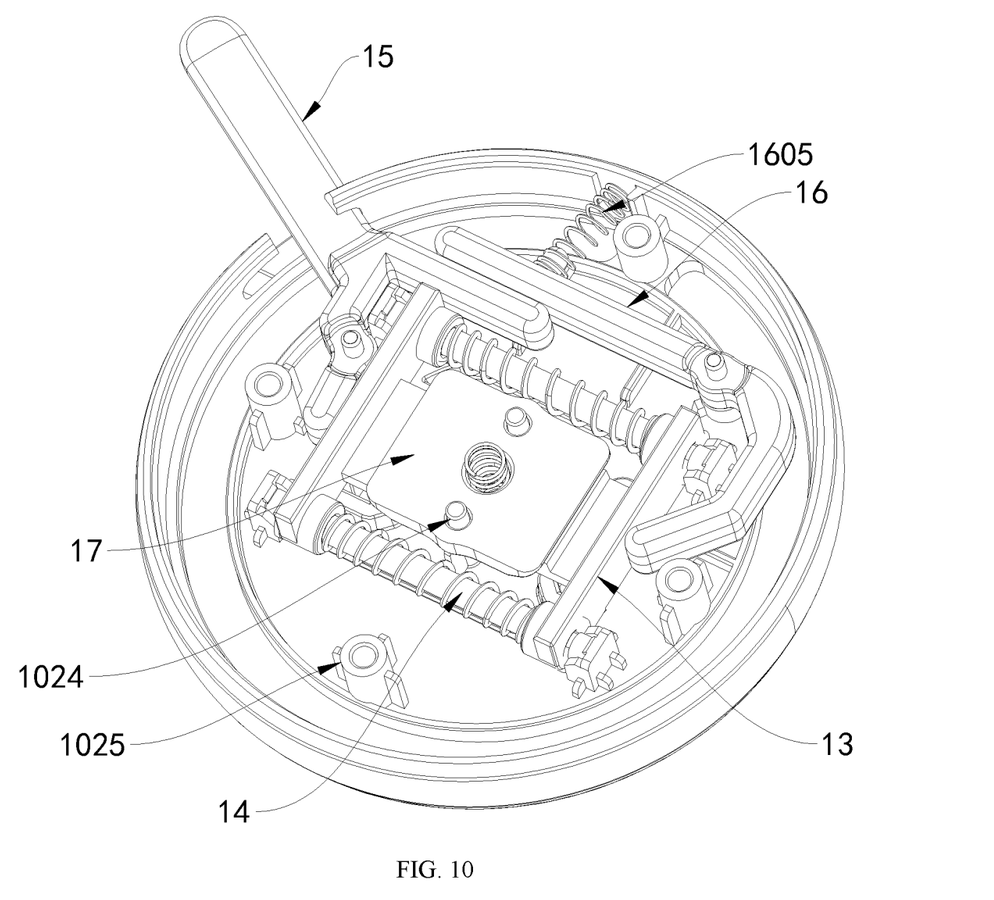
FIG. 10 is a schematic diagram of a reset state of a buckle crossbar of a quick release device according to the present disclosure.
Figure 11:
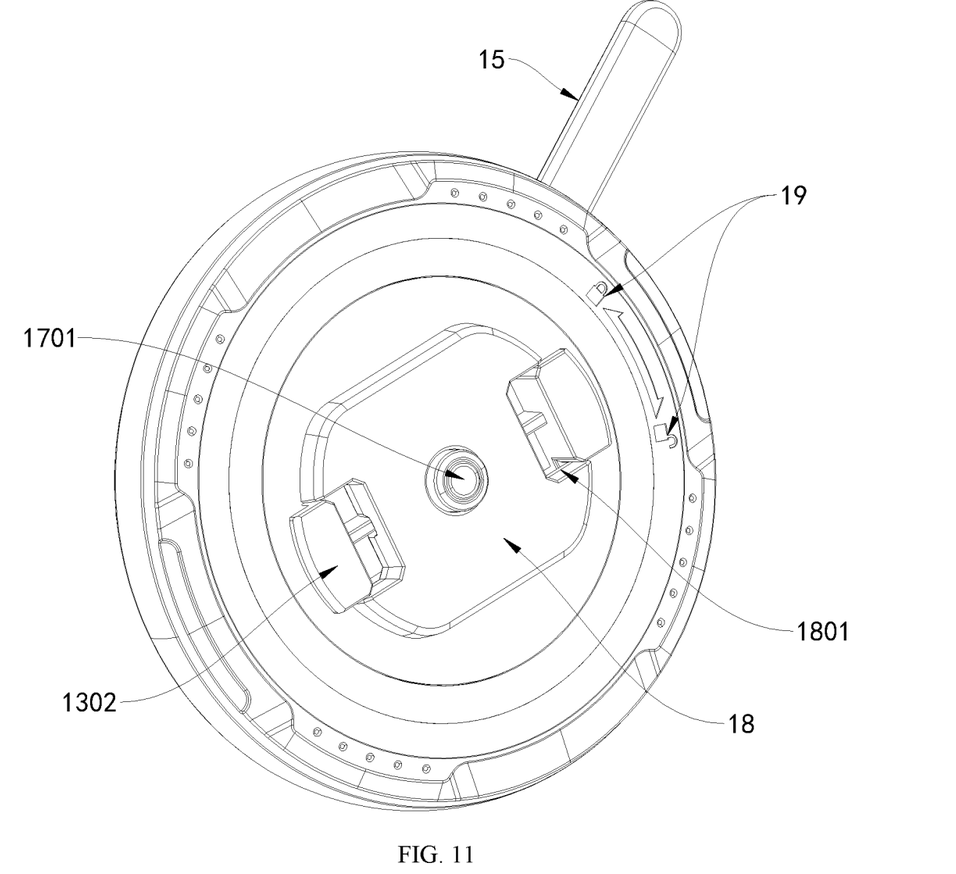
FIG. 11 is a schematic diagram of a clamping state of a buckle II of a quick release device according to the present disclosure.

As a specific technical solution of this embodiment, the toggle lever I 15 includes an operating rod 1501, and a driving rod 1502 and a toggle lever body I 1503 that are disposed on one end of the operating rod 1501, and the toggle lever body I 1503 is rotationally disposed inside the device body 1 through a rotary shaft I 1504. The toggle lever II 16 includes a toggle lever body II 1601 and a transmission rod (1602) that is disposed on one end of the toggle lever body II 1601. The toggle lever body II 1601 is rotationally disposed inside the device body (1) through a rotary shaft II (1603), and the one end of the toggle lever body I (1503) and the one end of the toggle lever body II (1601) respectively extend to opposite sides of the two buckle crossbars (13). Refer to FIG. 7 and FIG. 9. When a user toggles the operating rod 1501, the operating rod 1501 drives the toggle lever body I 1503 to rotate, to enable an end part of the toggle lever body I 1503 to abut against the buckle crossbar 13. In addition, the driving rod 1502 swings with the operating rod 1501, the driving rod 1502 abuts against the transmission rod 1602, the transmission rod 1602 drives the toggle lever body II 1601 to rotate, and an end part of the toggle lever body II 1601 abuts against another buckle crossbar 13. When the operating rod 1501 is toggled, the toggle lever body I 1503 and the toggle lever body II 1601 simultaneously toggle the two buckle crossbars 13 to move relative to each other. This structure is simple and ingenious, and operations are flexible.

As a specific technical solution of this embodiment, one end, away from the operating rod 1501, of the driving rod 1502 extends to a side of one shaft lever 14, and one end, away from the toggle lever body II 1601, of the transmission rod 1602 extends to a side of the driving rod 1502. A reset spring 1605 is sleeved on a side of the transmission rod 1602 through a spring post 1604, and one end, away from the driving rod 1502, of the operating rod 1501 extends outside the device body 1. When being toggled by the transmission rod 1502, the driving rod 1602 may compress the reset spring 1605. Due to disposing of the reset spring 1605, when the transmission rod 1602 is not influenced by a toggle force of the driving rod 1502, the reset spring 1605 rebounds and abuts against the transmission rod 1602 for rapidly resetting, and the transmission rod 1602 abuts against the driving rod 1502 for resetting. Therefore, the toggle lever body I 1503 and the toggle lever body II 1601 are separately from the two buckle crossbars 13, and when two buckle crossbars 13 moving relative to each other, the two buckle crossbars 13 slide on the shaft lever 14. In addition, the two buckle crossbars 13 compress the buckle spring 1401. Due to disposing of the buckle spring 1401, when the buckle I 1301 is separated from the positioning groove 1702, the buckle spring 1401 rebounds and abuts against the two buckle crossbars 13 for resetting.

Figure 4:
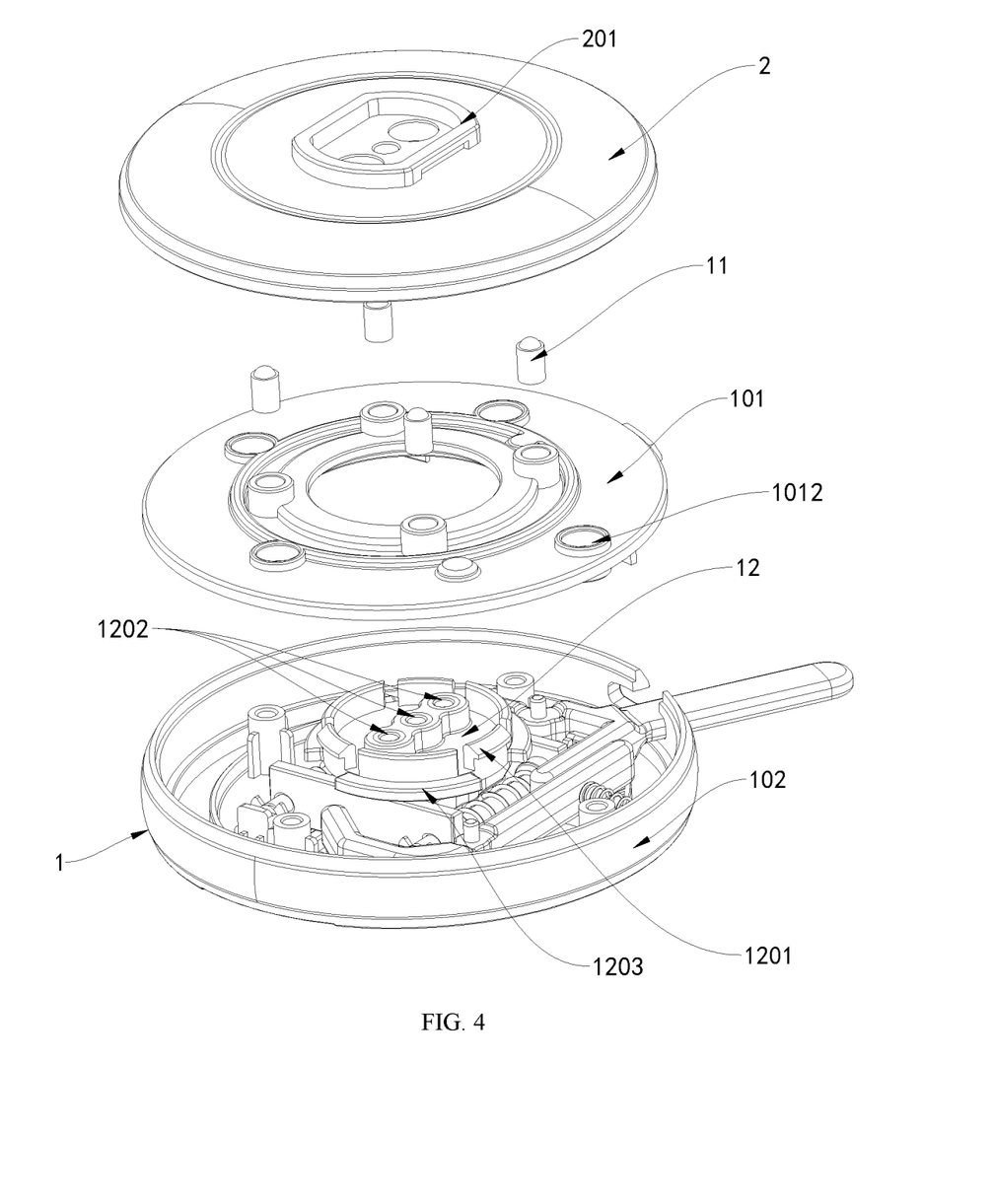
FIG. 4 is a schematic diagram of a structure of a spring-loaded bead of a quick release device according to the present disclosure.
Figure 5:
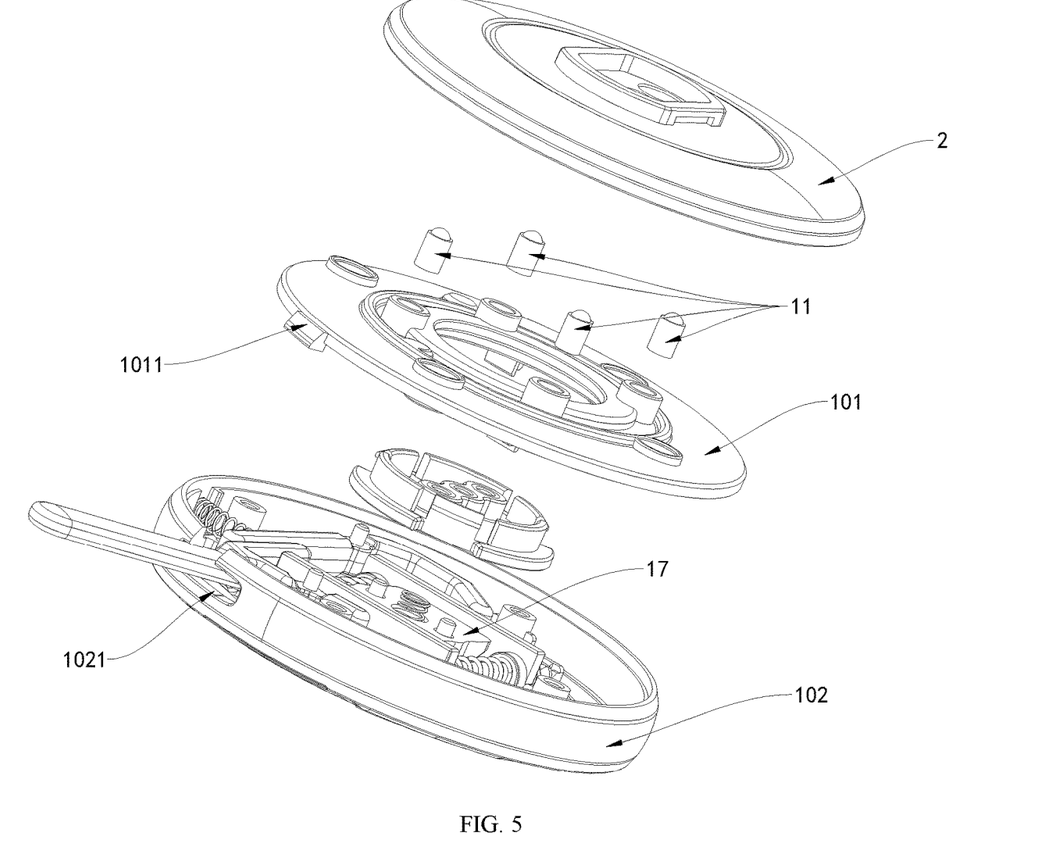
FIG. 5 is a schematic diagram of a structure of a return switch of a quick release device according to the present disclosure.
Figure 6:
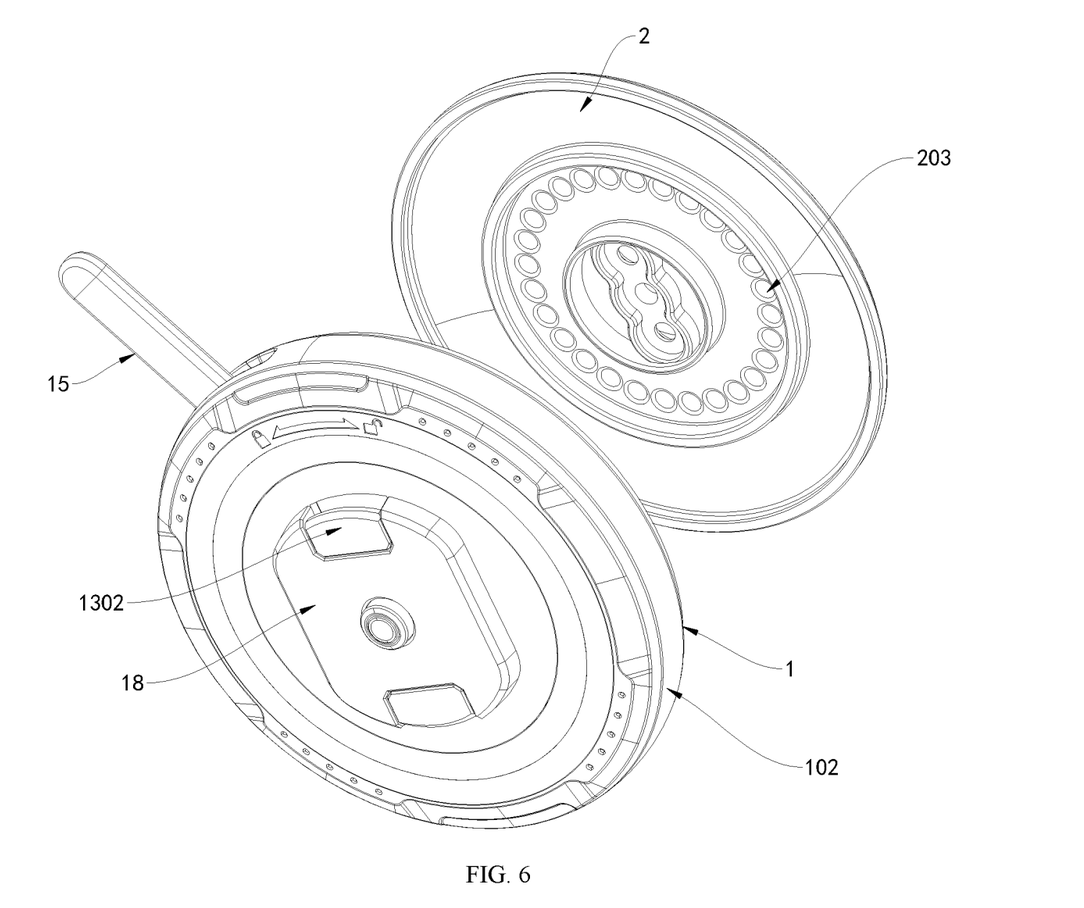
FIG. 6 is a schematic diagram of a structure of a bead groove of a quick release device according to the present disclosure.

As a specific technical solution of this embodiment, a fixing block 201 and a fixing hole 202 that is provided inside the fixing block 201 are disposed at a bottom of the rotary tray 2. A plurality of bead grooves 203 that are combined in a ring are provided at a top of the rotary tray 2, a spring-loaded bead 11 of which one end extends inside of one bead groove 203 is embedded at the bottom of the device body 1, and there is at least one spring-loaded bead 11. A plurality of buckle bodies 1201 that are combined in a ring are disposed at a bottom of the rotary buckle 12, the buckle bodies 1201 are clamped with a bottom of a bottom cover 101. A nut 1202 that is coaxially disposed with the fixing hole 202 is disposed at the bottom of the rotary buckle 12, the rotary buckle 12 is circular as a whole. A plurality of pallets 1203 are disposed on a circle of the rotary buckles 12, and bottoms of the pallets 1203 are slidingly connected to a top of the bottom cover 101. The fixing block 201 is used to connect to the terminal bracket. The terminal bracket may be a cycling bracket, a vehicle-mounted bracket, an image photographing bracket, and brackets for another sports equipment and electronic devices. In use, a bolt first passes through the fixing hole 202, and then is screwed inside the nut 1202, to complete fastening of the rotary tray 2 to the rotary buckle 12. The rotary tray 2 is connected to the terminal bracket through the fixing block 201, to rotate the device body 1. The device body 1 drives the spring-loaded bead 11 to abut against the bead groove 203, to enable the bead to be compressed and abut against a different bead groove 203 while the device body 1 rotates. Therefore, the device body 1 rotates 360° for positioning. Refer to FIG. 4.

There are four spring-loaded beads 11. Due to disposing of the four spring-loaded beads 11, stability of relative positions of the device body 1 and the rotary tray 2 is ensured, and the device body 1 does not rotate randomly without being affected by an external force.

Figure 8:
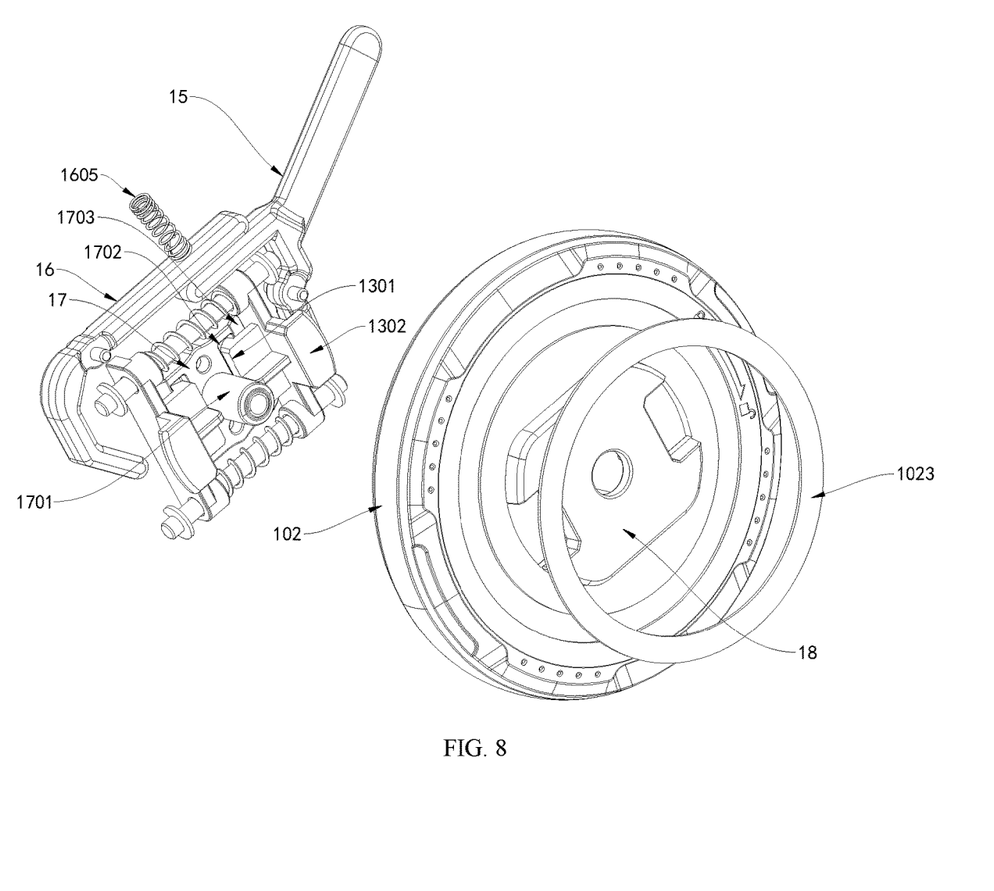
FIG. 8 is a schematic diagram of a clamping state of a buckle I and a positioning groove of a quick release device according to the present disclosure.

As a specific technical solution of this embodiment, guiding slopes 1703 are symmetrically disposed at two ends of the top of the return switch 17, the two guiding slopes 1703 are located on a side of the two positioning grooves 1702 each, and a switch spring 1704 that abuts against a top of the rotary buckle 12 is embedded at a bottom of the return switch 17. Refer to FIG. 8 and FIG. 9. Due to disposing of the guiding slopes 1703, when the buckle I 1301 is not clamped with the positioning groove 1702 and the operating rod 1501 is toggled, the operating rod 1501 drives the toggle lever body 11503 and the toggle lever body II 1601 to abut against the two buckle crossbars 13 and move relatively. When moving relative to each other, the two buckle crossbars 13 compress the buckle spring 1401, and the buckle crossbars 13 drive the buckle I 1301 to abut against the guiding slopes 1703. Due to slopes of the guiding slopes 1703, when abutting against the guiding slopes 1703, the buckle I 1301 is smoother, without jamming. When being abutted, the guiding slopes 1703 descend and compress the switch spring 1704. In addition, the button 1701 retracts inside the device body 1 from the bottom of the device body 1. When the buckle 1301 continues to move until being relative to the positioning groove 1702, the switch spring 1704 rebounds and abuts against the return switch 17, and the return switch 17 rises, to enable the positioning groove 1702 to be clamped with the buckle I 1301. Therefore, the buckle I 1301 is locked. After the user releases the operating rod 1501, the reset spring 1605 drives the operating rod 1501 to reset. Because the buckle I 1301 is clamped by the return switch 17, the buckle crossbars 13 do not be rebounded and abutted by the buckle spring 1401, and then reset. However, the buckle spring 1401 continues to rebound and abut against the two buckle crossbars 13. When the boss 18 and the buckle II 1302 are connected to the product housing, because the product housing is a mobile phone housing or a tablet computer housing with a groove, and is matched with the buckle II 1302 and the boss 18. Because the buckle I 1301 is clamped by the return switch 17, the buckle II 1302 is hidden inside the accommodation groove 1801. When the boss 18 and the buckle II 1302 are connected to the product housing, the boss 18 is clamped inside the product housing. In addition, when being abutted by the product housing, the button 1701 drives the return switch 17 to descend. When the return switch 17 descends, the positioning groove 1702 is separated from the buckle I 1301, to enable the buckle spring 1401 to immediately abut against the two buckle crossbars 13. Therefore, buckle crossbars 13 are away from each other. When the buckle crossbars 13 reset, the buckle crossbars 13 drive the buckle II 1302 to be clamped inside the product housing from an inner part of the accommodation groove 1801, to complete a connection between device body 1 and the product housing. Due to a manner that the button 1701 triggers the buckle II 1302, the procedure of connecting the product housing is simpler and faster.

Figure 1:
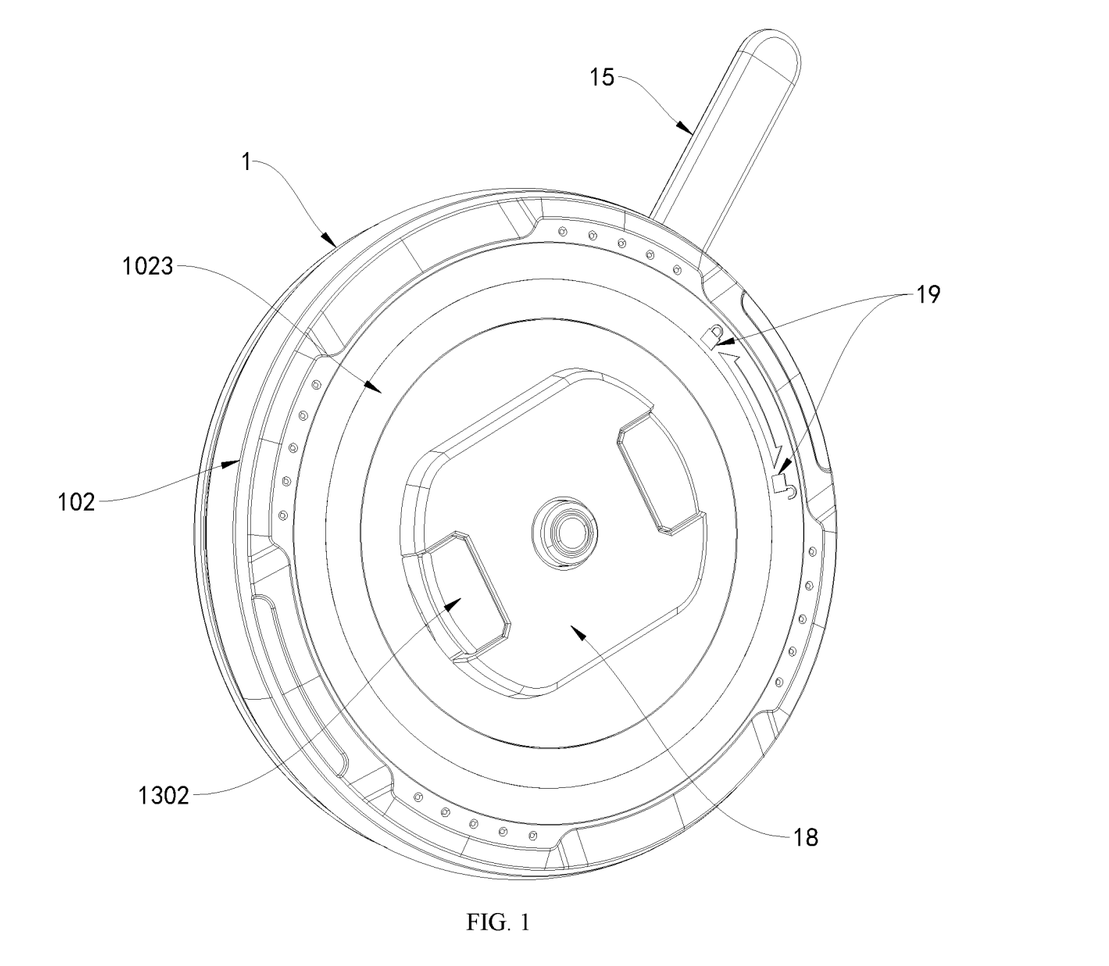
FIG. 1 is a top view of a structure of a quick release device according to the present disclosure.
Figure 2:
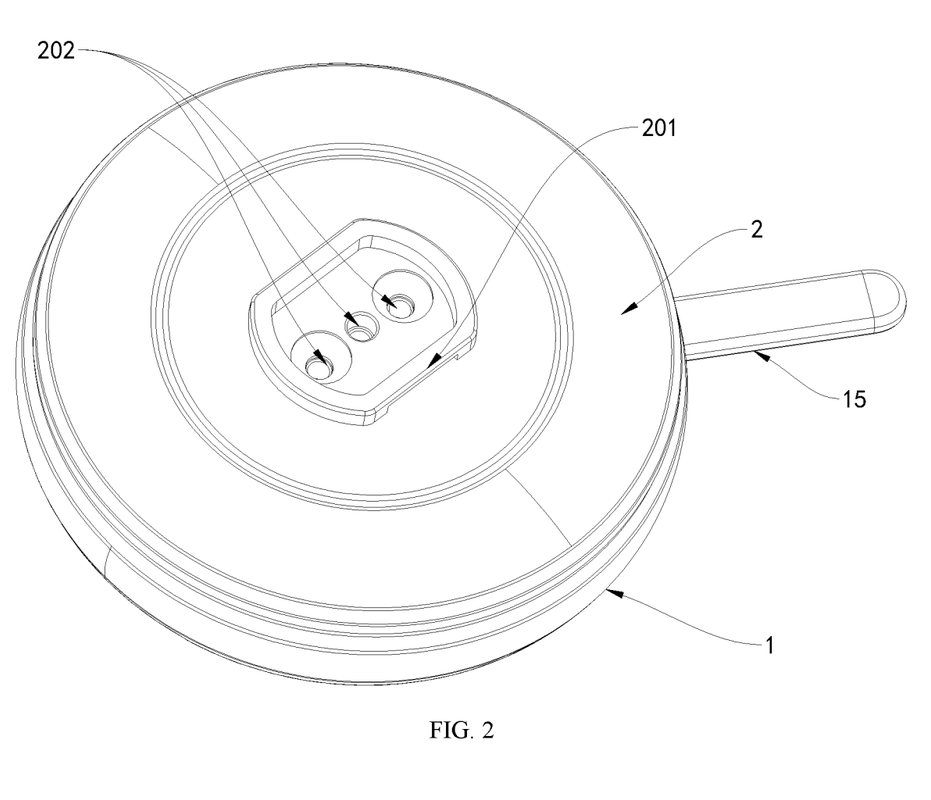
FIG. 2 is a bottom view of a structure of a quick release device according to the present disclosure.
Figure 3:
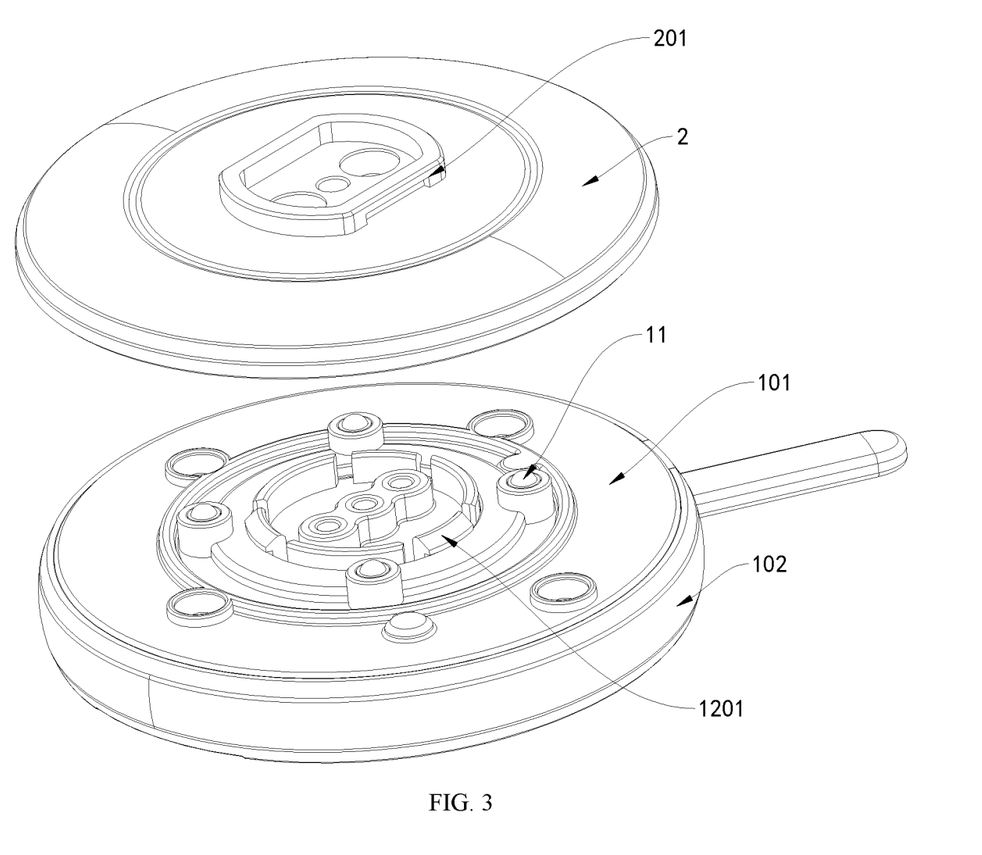
FIG. 3 is a schematic diagram of a structure of a bottom cover of a quick release device according to the present disclosure.

As a specific technical solution of this embodiment, the device body 1 is circular, the device body 1 includes a bottom cover 101 and an upper housing 102 that is disposed at a top of the bottom cover 101. A toggle lever groove 1021 that is sleeved with the operating rod 1501 is provided on an outer ring of the upper housing 102, and a press button 1011 of which one end is clamped inside the toggle lever groove 1021 is disposed on an outer ring of the bottom cover 101.

A clamping groove 1022 that is clamped with one end of the reset spring 1605 is disposed on an inner ring of the upper housing 102, and a non-slip mat 1023 is embedded in a top of the upper housing 102. At least one positioning column 1024 of which one end extends to the return switch 17 is disposed inside the upper housing 102, and a stud 1025 is disposed inside the upper housing 102. A screw hole 1012 that is coaxially provided with the stud 1025 is disposed inside the bottom cover 101, and there is at least one stud 1025 and at least one screw hole 1012. Refer to FIG. 1. The device body 1 is circular, with a good appearance, and the toggle lever groove 1021 is in a kidney shape. Therefore, a toggle range of the operating rod 1501 is sufficient, and the press button 1011 is clamped inside the toggle lever groove 1021. Due to disposing of the positioning column 1024, stability of the return switch 17 is ensured in ascending and descending processes. When the upper housing 102 and the bottom cover 101 are mounted, the bolt is screwed inside the stud 1025 through the screw hole 1012 to complete fastening of the upper housing 102 to the bottom cover 101.

As a specific technical solution of this embodiment, a boss 18 is disposed at the top of the upper housing 102, and two accommodation grooves 1801 are symmetrically provided at two ends of the boss 18. One end, away from the buckle crossbar 13, of the buckle II 1302 extends inside the accommodation grooves 1801, and a buckle sign 19 that is located at a side of the boss 18 is etched at the top of the upper housing 102. The user may lock and unlock the buckle II 1302 and the product housing by observing the buckle sign 19 and toggling the operating rod 1501. The operating rod 1501 may be toggled by one hand, and the operation process is more gradual.

As a specific technical solution of this embodiment, a reinforcing rib 1303 of which one end is fastened to a side of the buckle II 1302 is disposed at a top of the buckle I 1301, a shaft base 1026 that is sleeved with an end part of the shaft lever 14 is disposed inside the upper housing 102, a clamp spring 1402 is clamped with two ends of the shaft lever 14. Due to disposing of the reinforcing rib 1303, structural strengths of the buckle I 1301 and the buckle II 1302 are ensured. The shaft base 1026 is used to support an end part of the shaft lever 14, to ensure stability of the shaft lever 14.

Figure 12:
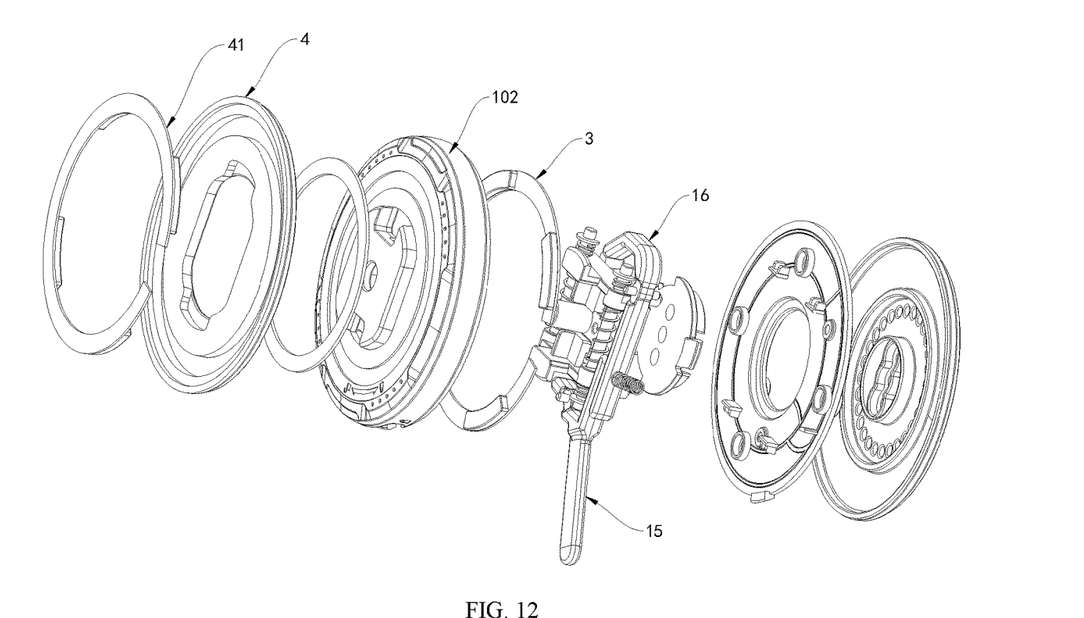
FIG. 12 is a schematic diagram of a structure of an embodiment 2 of a quick release device according to the present disclosure.
Figure 13:
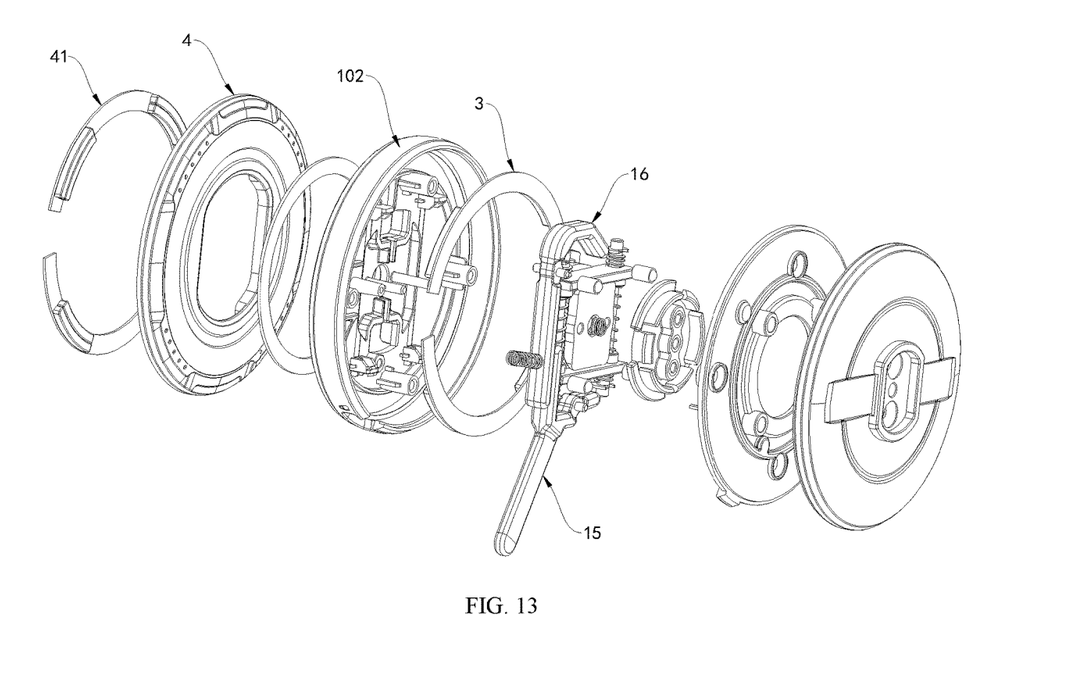
FIG. 13 is a schematic diagram of a structure of an embodiment 2 of a quick release device according to the present disclosure.

Embodiment 2. Refer to FIG. 12 and FIG. 13. The quick release device further includes a transmit end positioning neodymium magnet 3, a product housing tray 4, and a receive end positioning neodymium magnet 41 (compatible with a wireless charging function). The transmit end positioning neodymium magnet 3 is mounted inside an upper housing 102, and the product housing tray 4 is mounted on a product housing. The product shell tray 4 is provided with a groove that is matched with a buckle II 1302. The receive end positioning neodymium magnet 41 is mounted inside the product housing tray 4. Four neodymium magnetic projections 5 are separately disposed on the transmit end positioning neodymium magnet 3 and the receive end positioning neodymium magnet 41 each. The four neodymium magnetic projections 5 on the transmit end positioning neodymium magnet 3 and the four neodymium magnetic projections 5 on the receive end positioning neodymium magnet 41 are in polarity coincidence. Therefore, when the upper housing 102 is assembled with the product housing tray 4, the transmit end positioning neodymium magnet 3 automatically drives the upper housing 102 to rotate and calibrate a position at which the boss 18 is clamped with the product housing tray 4, so that an assembling process is more rapid.

In use, a bolt is screwed inside the stud 1025 through the screw hole 1012 to complete fastening of the upper housing 102 to the bottom cover 101. Then, the bolt passes through the fixing hole 202, and is screwed inside the nut 1202, to complete fastening of the rotary tray 2 to the rotary buckle 12. Finally, the rotary tray 2 is connected to a terminal bracket through the fixing block 201 to complete the connection. When the device body 1 rotates, the device body 1 drives the spring-loaded bead 11 to abut against the bead groove 203, to enable the bead to be compressed and abut against a different bead groove 203 while the device body 1 rotates. Therefore, the device body 1 rotates 360° for positioning. Refer to FIG. 1, FIG. 2, and FIG. 7 to FIG. 9. In this case, the buckle I 1301 is in a state of being clamped with a return switch 17, and the product housing may be connected. When the boss 18 and the buckle II 1302 are connected to the product housing, the boss 18 is clamped inside the product housing. In addition, when being abutted by the product housing, the button 1701 drives the return switch 17 to descend. When the return switch 17 descends, the positioning groove 1702 is separated from the buckle I 1301, to enable the buckle spring 1401 to immediately abut against the two buckle crossbars 13. Therefore, buckle crossbars 13 are away from each other. When the buckle crossbars 13 reset, the buckle crossbars 13 drive the buckle II 1302 to be clamped inside the product housing from an inner part of the accommodation groove 1801, complete a connection between device body 1 and the product housing.

When the product housing is removed, a user holds the product housing by one hand, and toggles the operating rod 1501 with fingers according to a buckle sign 19. The operating rod 1501 drives the toggle lever body 11503 to rotate, to enable an end part of the toggle lever body 11503 to abut against the buckle crossbar 13. In addition, the driving rod 1502 swings with the operating rod 1501, the driving rod 1502 abuts against the transmission rod 1602, the transmission rod 1602 drives the toggle lever body II 1601 to rotate, and an end part of the toggle lever body II 1601 abuts against another buckle crossbar 13. When the operating rod 1501 is toggled, the toggle lever body 11503 and the toggle lever body II 1601 simultaneously toggle the two buckle crossbars 13 to move relative to each other. When being toggled by the transmission rod 1502, the driving rod 1602 may compress the reset spring 1605. When moving relative to each other, the two buckle crossbars 13 compress the buckle spring 1401, and the buckle crossbars 13 drive the buckle II 1302 to be separated from the product housing, to separate the product housing from the device body 1.

When the product housing is disconnected from the device body 1, the button 1701 does not abut with the product housing, and the switch spring 1704 rebounds to drive the return switch 17 to rise. When the return switch 17 rises, the return switch 17 drives the positioning groove 1702 to be clamped with the buckle I 1301, to complete the positioning of the buckle I 1301. Therefore, the buckle II 1302 is kept in a state of being clamped with the product housing, to facilitate the user to use next time.

In conclusion, in the quick release device, through the spring-loaded bead 11, the device body 1 may rotate 360° for adjustment and positioning, to meet a use requirement of a user. The product housing may be removed by only holding the product housing and toggling the operating rod 1501. Therefore, operations are more simple, and convenience for outdoor sports is improved. Because the buckle II 1302 that may be triggered automatically through a button 1701 is clamped with the product housing, a procedure of assembling the product housing is further simplified. Because the buckle spring 1401 continuously abuts against the buckle crossbar 13, stability of a connection between the buckle II 1302 and the product housing, so that the product is more stable in a use process.

It should be noted that terms "including", "comprising", or any other variants thereof are intended to cover non-exclusive inclusion, such that a process, method, article, or device including a series of elements includes not only those elements but also other elements not explicitly listed, or elements inherent to such a process, method, article, or device. In case there are no more restrictions, an element limited by the statement "including a . . . " does not exclude the presence of additional identical elements in the process, the method, the article, or the device that includes the element.

Although the embodiments of the present disclosure have been illustrated and described, it should be understood that those of ordinary skill in the art may make various changes, modifications, replacements, and variations to the above embodiments without departing from the principle and spirit of the present disclosure, and the scope of the present disclosure is limited by the appended claims and their legal equivalents.

The invention claimed is:

1. A quick release device, comprising a device body (1), wherein a rotary tray (2) is movably disposed at a bottom of the device body (1), the rotary tray (2) is used to connect a terminal bracket, a rotary buckle (12) of which one end extends to the bottom of the device body (1) and is fastened to the rotary tray (2) is movably inside the device body (1), and the device body (1) rotates 360° relative to the rotary buckle (12) and the rotary tray (2);

two buckle crossbars (13) are symmetrically disposed inside the device body (1), two shaft levers (14) jointly pass through inner parts of the two buckle crossbars (13), first buckles (1301) are disposed on opposite surfaces of the two buckle crossbars (13), second buckles (1302) are disposed at tops of the buckle crossbars (13), and a buckle spring (1401) that is located between the two buckle crossbars (13) is sleeved on each of the shaft levers (14);

a first toggle lever (15) of which one end extends to a side of one buckle crossbar (13) and a second toggle lever (16) of which one end extends to a side of another buckle crossbar (13) are disposed inside the device body (1), the one end, away from the buckle crossbar (13), of the second toggle lever (16) extends to the first toggle lever (15), and the one end, away from the buckle crossbar (13), of the first toggle lever (15) extends outside the device body (1); and a return switch (17) that is located between the two buckle crossbars (13) is disposed inside the device body (1), a button (1701) of which one end extends outside the device body (1) and positioning grooves (1702) that are located on two sides of the button (1701) are disposed at a top of the return switch (17), and the two first buckles (1301) are respectively clamped with the two positioning grooves (1702).

2. The quick release device according to claim 1, wherein the first toggle lever (15) comprises an operating rod (1501), a driving rod (1502) and a first toggle lever body (1503), the driving rod (1502) and the first toggle lever body (1503) being disposed on one end of the operating rod (1501), and the first toggle lever body (1503) is rotationally disposed inside the device body (1) through a first rotary shaft (1504).

3. The quick release device according to claim 2, wherein the second toggle lever (16) comprises a second toggle lever body (1601) and a transmission rod (1602) that is disposed on one end of the second toggle lever body (1601), the second toggle lever body (1601) is rotationally disposed inside the device body (1) through a second rotary shaft (1603), and one end of the first toggle lever body (1503) and the one end of the second toggle lever body (1601) respectively extend to opposite sides of the two buckle crossbars (13).

4. The quick release device according to claim 3, wherein one end, away from the operating rod (1501), of the driving rod (1502) extends to a side of one shaft lever (14), one end, away from the second toggle lever body (1601), of the transmission rod (1602) extends to a side of the driving rod (1502), a reset spring (1605) is sleeved on a side of the transmission rod (1602) through a spring post (1604), and one end, away from the driving rod (1502), of the operating rod (1501) extends outside the device body (1).

5. The quick release device according to claim 4, wherein the device body (1) is circular, the device body (1) comprises a bottom cover (101) and an upper housing (102) that is disposed at a top of the bottom cover (101), a toggle lever groove (1021) that is sleeved with the operating rod (1501) is provided on an outer ring of the upper housing (102), and a press button (1011) of which one end is clamped inside the toggle lever groove (1021) is disposed on an outer ring of the bottom cover (101); and a clamping groove (1022) that is clamped with one end of the reset spring (1605) is disposed on an inner ring of the upper housing (102), a non-slip mat (1023) is embedded in a top of the upper housing (102), at least one positioning column (1024) of which one end extends to the return switch (17) is disposed inside the upper housing (102), a stud (1025) is disposed inside the upper housing (102), a screw hole (1012) that is coaxially provided with the stud (1025) is disposed inside the bottom cover (101), and there is at least one stud (1025) and at least one screw hole (1012).

6. The quick release device according to claim 5, wherein a boss (18) is disposed at the top of the upper housing (102), two accommodation grooves (1801) are symmetrically provided at two ends of the boss (18), one end, away from the buckle crossbar (13), of the second buckles (1302) extends inside the accommodation grooves (1801), and a buckle sign (19) that is located at a side of the boss (18) is etched at the top of the upper housing (102).

7. The quick release device according to claim 6, wherein a reinforcing rib (1303) of which one end is fastened to a side of the second buckles (1302) is disposed at a top of the first buckles (1301), a shaft base (1026) that is sleeved with an end part of the shaft lever (14) is disposed inside the upper housing (102), a clamp spring (1402) is clamped with two ends of the shaft lever (14).

8. The quick release device according to claim 1, wherein a fixing block (201) and a fixing hole (202) that is provided inside the fixing block (201) are disposed at a bottom of the rotary tray (2), a plurality of bead grooves (203) that are combined in a ring are provided at a top of the rotary tray (2), a spring-loaded bead (11) of which one end extends inside of one bead groove (203) is embedded at the bottom of the device body (1), and there is at least one spring-loaded bead (11).

9. The quick release device according to claim 1, wherein a plurality of buckle bodies (1201) that are combined in a ring are disposed at a bottom of the rotary buckle (12), the buckle bodies (1201) are clamped with a bottom of a bottom cover (101), a nut (1202) that is coaxially disposed with the fixing hole (202) is disposed at the bottom of the rotary buckle (12), the rotary buckle (12) is circular as a whole, a plurality of pallets (1203) are disposed on a circle of the rotary buckle (12), and bottoms of the pallets (1203) are slidingly connected to a top of the bottom cover (101).

10. The quick release device according to claim 1, wherein guiding slopes (1703) are symmetrically disposed at two ends of the top of the return switch (17), the two guiding slopes (1703) are located on a side of each positioning groove (1702), and a switch spring (1704) that abuts against a top of the rotary buckle (12) is embedded at a bottom of the return switch (17).

* * * * *